(12) United States Patent
Brough et al.

(10) Patent No.: US 11,886,095 B2
(45) Date of Patent: Jan. 30, 2024

(54) SCALABLE UNIT CELL DEVICE FOR LARGE TWO-DIMENSIONAL ARRAYS WITH INTEGRATED PHASE CONTROL

(71) Applicant: Raytheon Company, Waltham, MA (US)

(72) Inventors: Christopher Casimir Brough, El Segundo, CA (US); Sean P. Kilcoyne, Lompoc, CA (US); Richard Wahl, Lubbock, TX (US); Thomas Yengst, El Segundo, CA (US); Justin Gordon Adams Wehner, Goleta, CA (US)

(73) Assignee: Raytheon Company, Tewksbury, MA (US)

( * ) Notice: Subject to any disclaimer, the term of this patent is extended or adjusted under 35 U.S.C. 154(b) by 0 days.

(21) Appl. No.: 17/721,884

(22) Filed: Apr. 15, 2022

(65) Prior Publication Data

US 2023/0333442 A1    Oct. 19, 2023

(51) Int. Cl.
*G02F 1/295*    (2006.01)
(52) U.S. Cl.
CPC .................................. *G02F 1/2955* (2013.01)
(58) Field of Classification Search
CPC ............... G02F 1/2955; G02F 2203/24; G02B 6/12009; G02B 6/29301; G02B 27/0087
See application file for complete search history.

(56) References Cited

U.S. PATENT DOCUMENTS 10,634,973 B2    4/2020    Hashemi et al.
10,656,496 B2    5/2020    Hashemi et al.
2019/0227351 A1    7/2019    Behroozpour
2020/0284883 A1    9/2020    Ferreira
2021/0210455 A1    7/2021    Getty
2021/0278707 A1    9/2021    Moss (Continued)

FOREIGN PATENT DOCUMENTS

WO    2022067268 A2    3/2022

OTHER PUBLICATIONS

Kim, et al., "Single-Chip OPA in Wafer-Scale Si Photonics/3D-Integration Platform " IEEE JSSC, Nov. 2019.

(Continued)

*Primary Examiner* — John Bedtelyon
(74) *Attorney, Agent, or Firm* — Renner, Otto, Boisselle & Sklar LLP

(57) ABSTRACT

A scalable independent unit cell device architecture may include a phase-shifting element and a phase shift driver both integrated within the unit cell device. The phase shift driver may be coupled to the phase-shifting element and the phase shift driver may independently control the phase-shifting element to produce an optical beam having a desired phase. The unit cell device may further include an optical antenna that outputs the beam having the desired phase. The unit cell device may be formed as an opto-electronic hybrid optimized to leverage direct bond hybridization (DBH) to attach an electronic integrated circuit wafer to a side of a photonic integrated circuit wafer. The resulting unit cell device (i.e., 24 microns) may tightly integrate individual element-level phase control, which may be implemented within large-scale two-dimensional photonic arrays with hemispherical beam steering.

20 Claims, 5 Drawing Sheets

(56) References Cited

U.S. PATENT DOCUMENTS

2022/0075186 A1* 3/2022 Watts .................... G02F 1/2955

OTHER PUBLICATIONS

Amato, Francesco et al., "Photonic integrated circuits for ultra-fast steering in phased-array antennas," Proc. SPIE 11180, International Conference on Space Optics—ICSO 2018, 1118078 (Jul. 12, 2019); https://doi.org/10.1117/12.2536179.
Cao, Zizheng et al., "Advanced Integration Techniques on Broadband Millimeter-Wave Beam Steering for 5G Wireless Networks and Beyond", IEEE Journal of Quantum Electronics ( vol. 52, Issue: 1, Jan. 2016), DOI. 10.1109/JQE.2015.2509256.
International Search Report and Written Opinion issue for related International Application No. PCT/US2023/061440; dated May 9, 2023.

* cited by examiner

SCALABLE UNIT CELL DEVICE FOR LARGE TWO-DIMENSIONAL ARRAYS WITH INTEGRATED PHASE CONTROL

TECHNICAL FIELD

The present disclosure relates to unit cell device architectures that enable large-element-count two-dimensional (2D) arrays for transmitting and receiving electromagnetic radiation.

DESCRIPTION OF THE RELATED ART

A common problem for industries relying on steered optical beams is how to realize and control large-scale 2D phased-array architectures, such as large-scale photonic integrated circuit (PIC) phased arrays having tens of millions of radiating elements (and associated phase-control elements). As the array element count grows certain problems gain increasing urgency; for example, each phase-control element of PIC phased arrays requires electrical interconnects which limits array density, how to achieve phase change of each element, and how to achieve sufficiently dense radiators such that the far field pattern is able to be shaped and steered. For low-element-count PIC phased arrays (e.g., an 8×8 PIC phased array), the electrical interconnects of each of the phase-control elements may be realized via lateral routing of circuitry along a surface of the PIC (e.g., lateral electrical trace routing); however, as the number of phase-control elements is scaled up, using lateral routing of the circuitry along the surface of the PIC to implement the electrical interconnects of each of the phase-control elements becomes unsustainable. As the array size increases, layout constraints can achieve connection with only a sub-set of optical elements while the remaining optical elements are left with no way to achieve electrical communication. Accordingly, there is room for improvement in this field of endeavor.

SUMMARY

The present disclosure provides techniques related to unit cells for creating large two-dimensional (2D) phased array architectures. Each unit cell may include a phase-shifting element, a phase shift driver, optical routing elements, and radiators (e.g., antennas) integrated within the unit cell. The phase shift driver may be in electrical communication with the phase-shifting element and the phase shift driver may be configured to independently control the phase-shifting element to produce a modified optical beam. Various exemplary embodiments of the unit cell are considered in the present disclosure, including unit cells with a photonic integrated circuit (PIC), a phase shift driver including an electric integrated circuit (EIC) or a digital read-in integrated circuit (DRIIC) and antennas coupled to the phase modulators. In some exemplary embodiments, waveguides may be used to connect optical elements while electrical connections may be used to connect elements of the PIC to the EIC or DRIIC. These connections may be vertically integrated to enable dense packing of array elements, which may facilitate constructive interference between antenna elements to create a far field effect of beam steering. Each unit may be individually/independently controlled by its corresponding phase shift driver.

The unit cell device may be formed as an electro-optical hybrid optimized to leverage direct bond hybridization (DBH), also known as hybrid bonding, to attach a digital read-in integrated circuit (DRIIC) wafer to a side of a photonic integrated circuit (PIC) wafer. The resulting relatively small unit cell device (e.g., 24 microns) tightly integrates individual element-level phase control, making possible large two-dimensional photonic phased arrays with hemispherical beam steering.

According to an aspect of the disclosure, a unit cell device including one or more attached layers may include a phase-shifting element and a phase shift driver. The phase shift driver and the phase-shifting element may be integrated within the unit cell device and the phase shift driver may be in electrical communication with the phase-shifting element. The phase shift driver may be configured to independently control the phase-shifting element to produce a modified optical beam.

According to an embodiment of any paragraph(s) of this summary, the unit cell device may further include a photonic integrated circuit (PIC) where the phase shift driver is attached to at least a portion of the PIC.

According to an embodiment of any paragraph(s) of this summary, the phase shift driver may be an electronic integrated circuit (EIC).

According to an embodiment of any paragraph(s) of this summary, the EIC may be a digital read-in integrated circuit.

According to an embodiment of any paragraph(s) of this summary, at least a portion of the EIC is directly bonded to the PIC to enable mechanical and electrical integration.

According to an embodiment of any paragraph(s) of this summary, the unit cell device may further include an optical antenna electromagnetically coupled to the phase-shifting element where the modified optical beam may be a transmit beam or a receive beam.

According to an embodiment of any paragraph(s) of this summary, the unit cell device may further include a PIC electrical routing element in electrical communication with the phase-shifting element at a position that is vertically above the optical antenna.

According to an embodiment of any paragraph(s) of this summary, the unit cell device may further include a PIC electrical routing element in electrical communication with the phase-shifting element at a position that is vertically below the optical antenna.

According to an embodiment of any paragraph(s) of this summary, the unit cell device may further include a PIC electrical routing element in electrical communication with the phase-shifting element, an electronic driver circuit, an EIC electrical routing element in electrical communication with the electronic driver circuit, and a direct bond hybridization (DBH) connection point where the PIC electrical routing element may be attached to the EIC routing element at the DBH connection point.

According to an aspect of the disclosure, an array of unit cell devices may be provided where each unit cell device may include a phase-shifting element, and a phase shift driver integrated within the unit cell device where the phase shift driver may be in electrical communication with the phase-shifting element and where the phase shift driver may be configured to independently control the phase-shifting element to produce a modified optical beam and where the array of unit cell devices may form an electro-optical phased array.

According to an embodiment of any paragraph(s) of this summary, each unit cell device of the array of unit cell devices may include a photonic integrated circuit (PIC) and the phase shift driver may be attached to at least a portion of the PIC.

According to an embodiment of any paragraph(s) of this summary, the phase shift driver may be an electronic integrated circuit (EIC).

According to an embodiment of any paragraph(s) of this summary, the EIC may be a digital read-in integrated circuit (DRIIC).

According to an embodiment of any paragraph(s) of this summary, each unit cell device of the array of unit cell devices may include an optical antenna and each of the modified optical beams of adjacent unit cell devices may interfere with one another to form a transmit beam or a receive beam that is shapeable and hemispherically steerable.

According to an aspect of the disclosure, a method of independently controlling optical beam phase within a unit cell device may include independently controlling, by a phase shift driver integrated within the unit cell device, a phase-shifting element to produce a modified optical beam.

According to an embodiment of any paragraph(s) of this summary, the method may include connecting the phase shift driver to at least a portion of a photonic integrated circuit (PIC).

According to an embodiment of any paragraph(s) of this summary, the method may include implementing an electronic integrated circuit as the phase shift driver.

According to an embodiment of any paragraph(s) of this summary, the method may include implementing a digital read-in integrated circuit (DRIIC) as the phase shift driver.

According to an embodiment of any paragraph(s) of this summary, the method may include directly bonding the PIC to the EIC.

According to an embodiment of any paragraph(s) of this summary, the method may include emitting or receiving, by an optical antenna electromagnetically coupled to the phase-shifting element, the modified optical beam.

According to an embodiment of any paragraph(s) of this summary, the method may include removing a substrate of the PIC such that emitting or receiving the modified optical beam is unobstructed.

According to an embodiment of any paragraph(s) of this summary, the method may include removing at least a portion of a substrate of the EIC (or DRIIC) to form an optical fiber trench coupling.

According to an embodiment of any paragraph(s) of this summary, the method further includes etching the EIC to form an optical fiber trench coupling.

To the accomplishment of the foregoing and related ends, the present disclosure includes the features hereinafter fully described and particularly pointed out in the claims. The following description and the annexed drawings set forth in detail certain illustrative embodiments in accordance with the present disclosure. These embodiments are indicative, however, of but a few of the various ways in which the principles of the disclosure may be employed. Other objects, advantages and novel features of the disclosure will become apparent from the following detailed description when considered in conjunction with the drawings.

BRIEF DESCRIPTION OF DRAWINGS

The annexed drawings, which are not necessarily to scale, show various aspects in accordance with the present disclosure.

DETAILED DESCRIPTION

A unit cell device, which may also be referred to as hybrid unit cell device or unit cell, may include a phase-shifting element and a phase shift driver integrated within the unit cell device. The phase shift driver may be in electrical communication with the phase-shifting element and the phase shift driver may independently control the phase-shifting element to produce a modified optical beam. The unit cell device may further include an optical antenna that may emit the modified beam or apply the phase shift to a received beam.

One advantage of the unit cell device architecture is its small footprint and ability to integrate individual element-level phase control, making possible large two-dimensional (2D) photonic arrays with hemispherical beam steering. Such a structure offers increased performance at a fraction of the size and weight of conventional systems. For example, an array of unit cells may be used to form a large-scale optical phased array (OPA) having tens of millions of radiating elements that may be collectively used for hemispherical beam steering for various applications, such as Free Space Optical Communication (FSOC).

Figure 1:
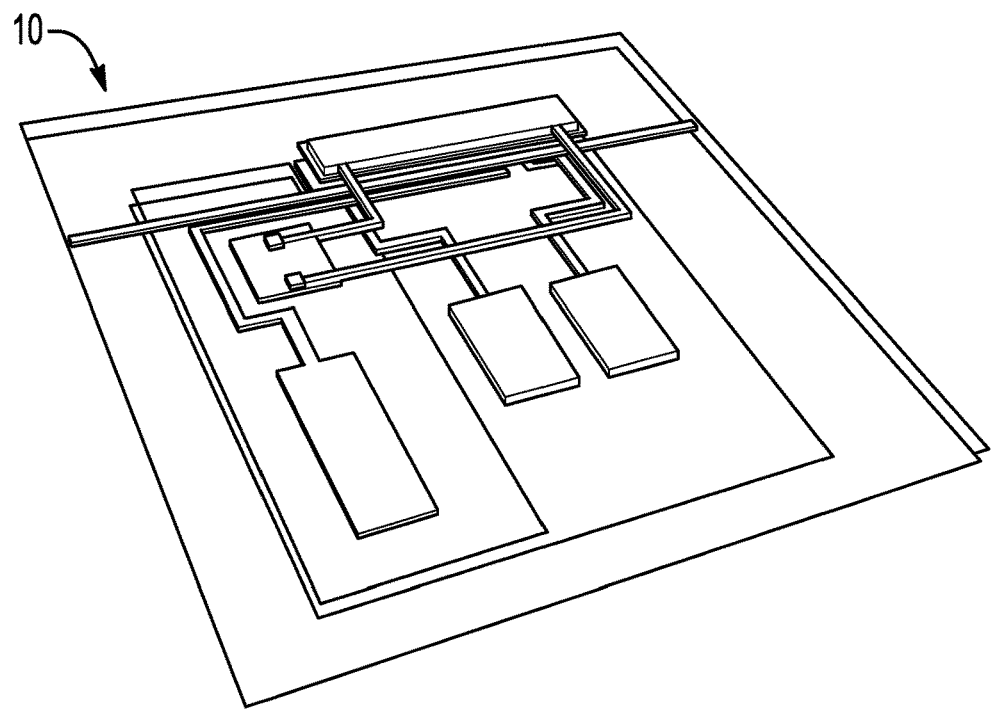
FIG. 1 is an oblique view of a unit cell device with integrated phase control in accordance with an embodiment of the present disclosure.

FIG. 1 shows an oblique view of a unit cell device 10 in accordance with an embodiment of the present disclosure. The unit cell device 10 may include an electronic integrated circuit (EIC) 12 (FIG. 2), such as a digital read-in integrated circuit (DRIIC), attached to a photonic integrated circuit (PIC) 14 (FIG. 3), such as a fabricated PIC on silicon on insulator (SOI) wafer. The EIC 12 and the PIC 14 may be at least partially overlapping, in different layers of the unit cell device 10, as described further below.

More broadly, the EIC 12 and PIC 14 and their various components, some embodiments of which are described below, may be integrated within or as parts of the unit cell device 10. The term "integrated within," as used herein, refers to components being contained as inseparable elements of a single device. Having the components in overlapping joined layers of a device, or in a single layer of such a device, is one way in which components may be integrated within a device. The integrated unit cell contains all repeated components necessary to support a functional array, in contrast to a non-integrated device architecture where the repeated array and control elements are not aligned in a unit cell (e.g., the control elements are located away from the array elements, or the antenna elements are grouped together in one location and the control elements are grouped together in a separate location).

Figure 2:
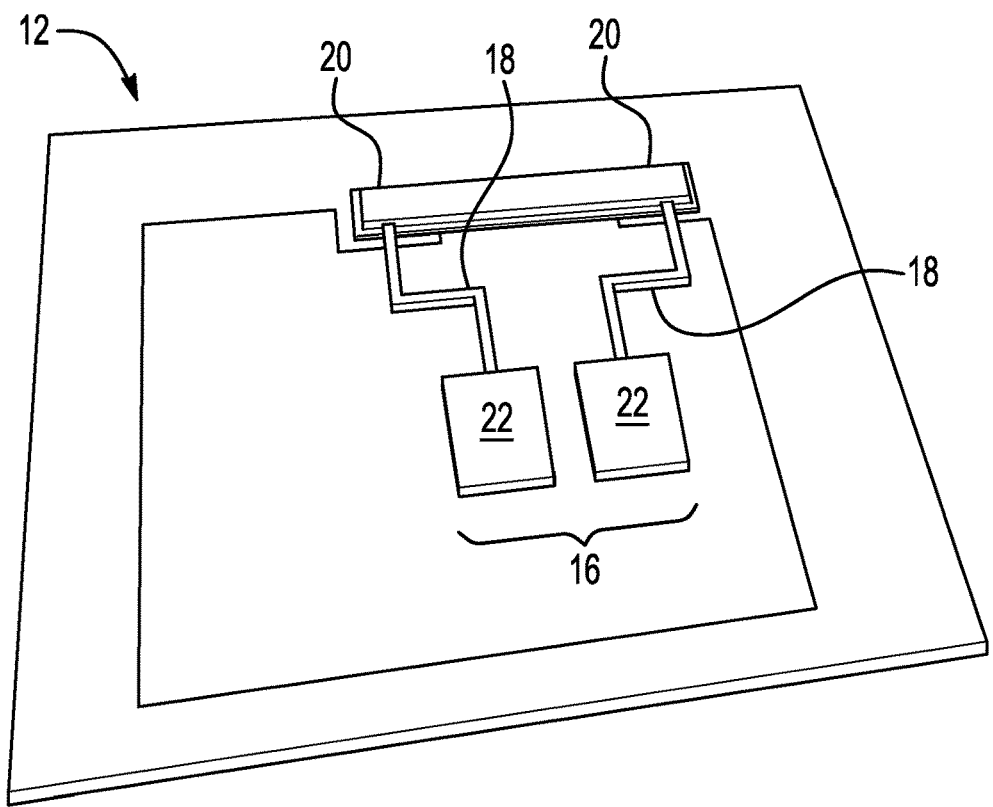
FIG. 2 is an oblique view of an electronic integrated circuit (EIC) of the unit cell device of FIG. 1.

FIG. 2 shows an oblique view of the EIC 12 where a phase shift driver 16, EIC electrical routing elements 18, and EIC direct bond hybridization (DBH) connection points 20 may be integrated thereon. The phase shift driver 16 may be in electrical communication with the EIC electrical routing elements 18 and the EIC electrical routing elements 18 may be in electrical communication with the EIC DBH connection points 20. In an exemplary embodiment, the phase shift driver 16 may include an electronic driver circuit 22, and the electronic driver circuit 22 may be in electrical communication with the EIC routing elements 18.

Figure 3:
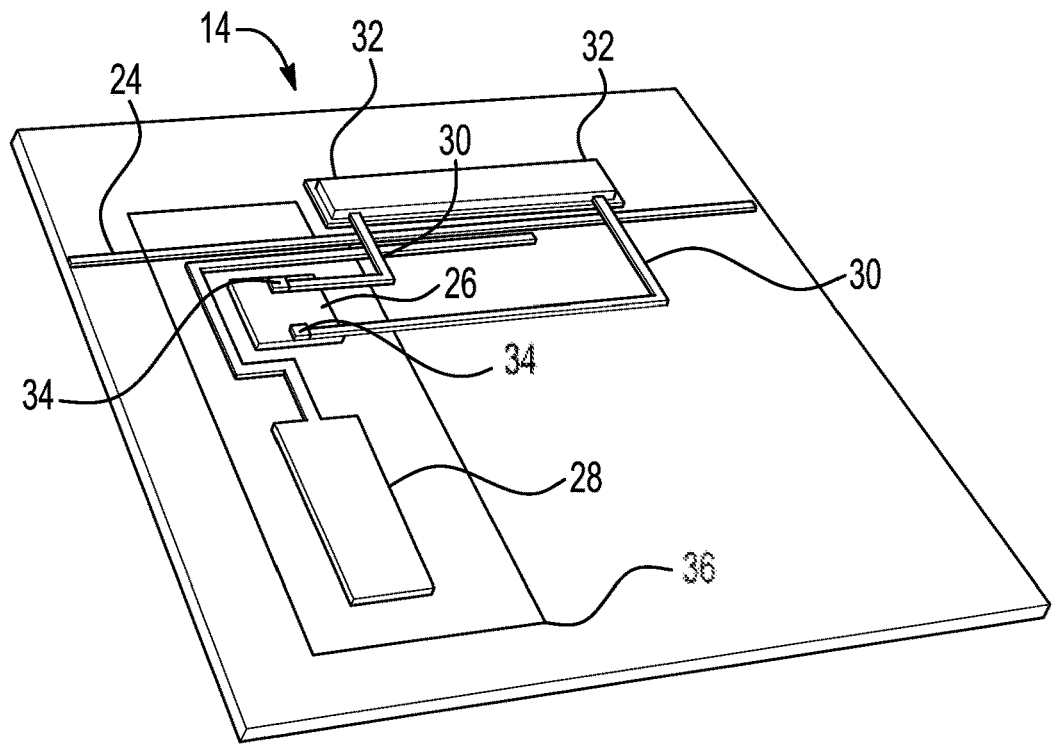
FIG. 3 is an oblique view of a photonic integrated circuit (PIC) of the unit cell device of FIG. 1.

FIG. 3 shows an oblique view of the PIC 14 with an optical routing element 24, such as a waveguide 24, a phase-shifting element 26, an optical antenna 28, PIC electrical routing elements 30, and PIC direct bond hybridization (DBH) connection points 32. The waveguide 24 may be electromagnetically coupled to the optical antenna 28, the phase shifting element 26 may be electromagnetically coupled to the optical antenna 28 and in electrical communication with the PIC electrical routing elements 30 (i.e., attached at connection points 34), and the PIC electrical routing elements 30 may be attached to the PIC DBH connection points 32. In an exemplary embodiment, the phase shifting element 26 may be a thermo-optic phase shifting device, such as a heating device, and the optical antenna 28 may be an optical silicon grating antenna. However, the phase shifting element 26 and the optical antenna 28 may be any other suitable elements (e.g., the phase shifting element 26 may be an electro-optic phase shifting device and the optical antenna 28 may be an optical nanoantenna). The unit cell device may further include a reflector device 36 integrated on the EIC that provides enhanced directional reflecting for the PIC 14.

Figure 4:
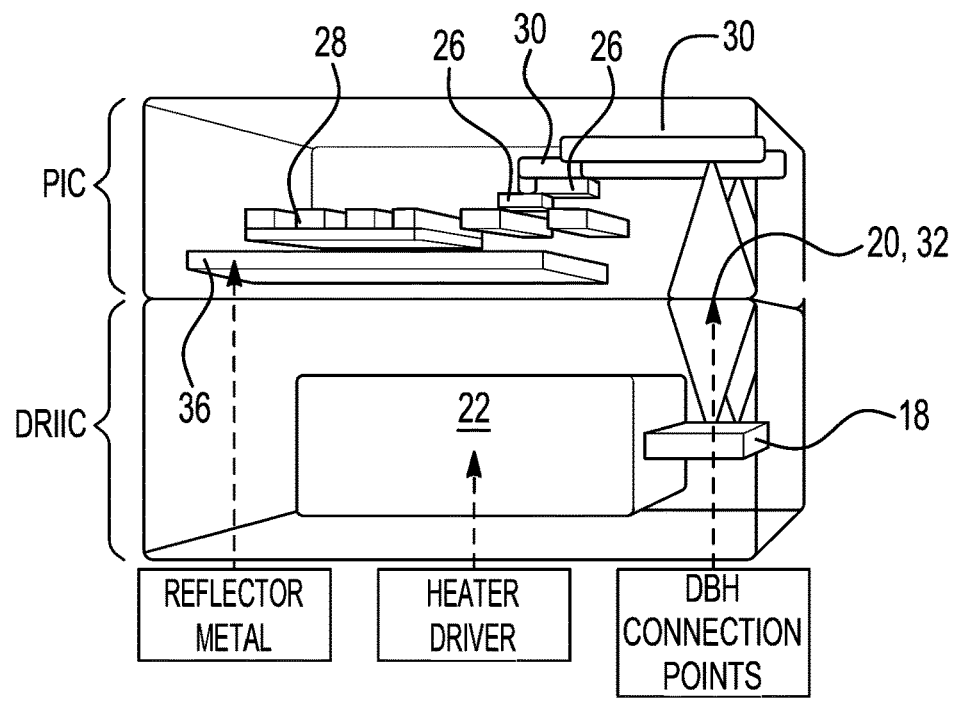
FIG. 4 is a cross section view of an exemplary embodiment of the unit cell device of FIG. 1.
Figure 5:
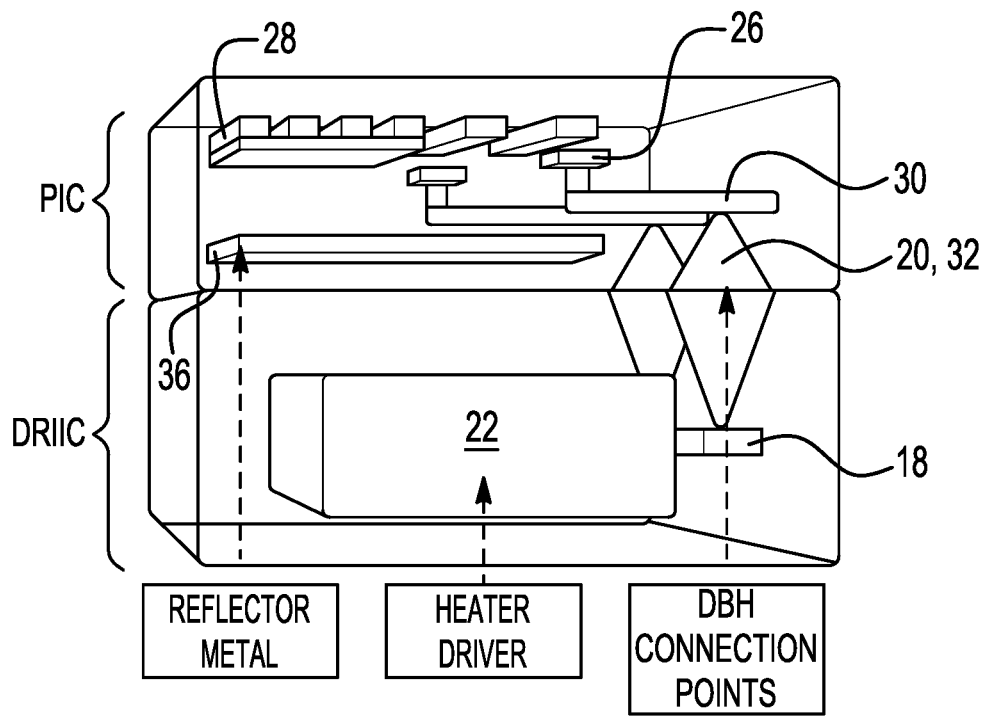
FIG. 5 is a cross section view of another exemplary embodiment of the unit cell device 1.

FIG. 4 shows a cross section view of an exemplary embodiment of the unit cell device 10. As shown in FIG. 4, the phase shifting element 26 and the PIC routing elements 30 may be integrated on the PIC 14 such that the connection points 32 between the phase shifting element 26 and the PIC routing elements 30 may be provided at a position that is vertically above the optical antenna 28. FIG. 5 shows a cross section view of another exemplary embodiment of the unit cell device. As shown in FIG. 5, the phase shifting element 26 and the PIC routing elements 30 may be integrated on the PIC 14 such that the connection points 32 between the phase shifting element 26 and the PIC routing elements 30 may be provided at a position that is vertically below the optical antenna 28. While particular elements and configurations of the EIC 12 and the PIC 14 have been described, the EIC 12 and the PIC 14 may include any suitable elements and may take on any suitable configurations. In an exemplary embodiment, an overall width W of the unit cell device 10 may be 24 microns (µm), although other sizes are possible.

The unit cell device 10 may utilize a direct bond hybridization (DBH) interconnect process (e.g., wafer-level hybridization) to attach the PIC and EIC enabling mechanical and electrical integration. For example, the DBH structure consists of a volume of contact metal on top of a metal routing layer that is confined by a planarized dielectric layer. The DBH structure is applied with wafer-scale processing to the PIC unit cells and the DRIIC unit cells. The DHH structures are then bonded together to form a permanent mechanical oxide bond and a metal-to-metal interconnection. In this example, DBH interconnection permanently joins the PIC and DRIIC into a single unit cell.

Other exemplary DBH interconnect process techniques are described in co-owned U.S. Patent Application Publication Number US 2021/0210455, which is incorporated herein by reference in its entirety. While a particular direct bonding technique has been described, it is to be understood that any suitable bonding technique may be utilized, such as, for example, bump bonding techniques.

In operation, an optical coupler (not shown) may guide a beam (e.g., an optical beam) into the waveguide 24 of the PIC 14 using any suitable coupling technique. The beam may propagate through the waveguide 24 to the antenna 28 and phase shifting element 26. The phase shift driver 18 may receive and/or generate control signals (not shown) that may determine a desired phase to be applied to the beam. Upon receiving and/or generating the control signals, the phase shift driver 18 may cause the electronic driver circuit 22 to drive the phase shifting element 26 such that the phase shifting element 26 produces a modified beam at the antenna 28. The optical antenna 28 may emit the modified beam or apply the phase shift to a received beam. As such, the unit cell device 10 may independently control the phase of the modified beam.

Figure 6:
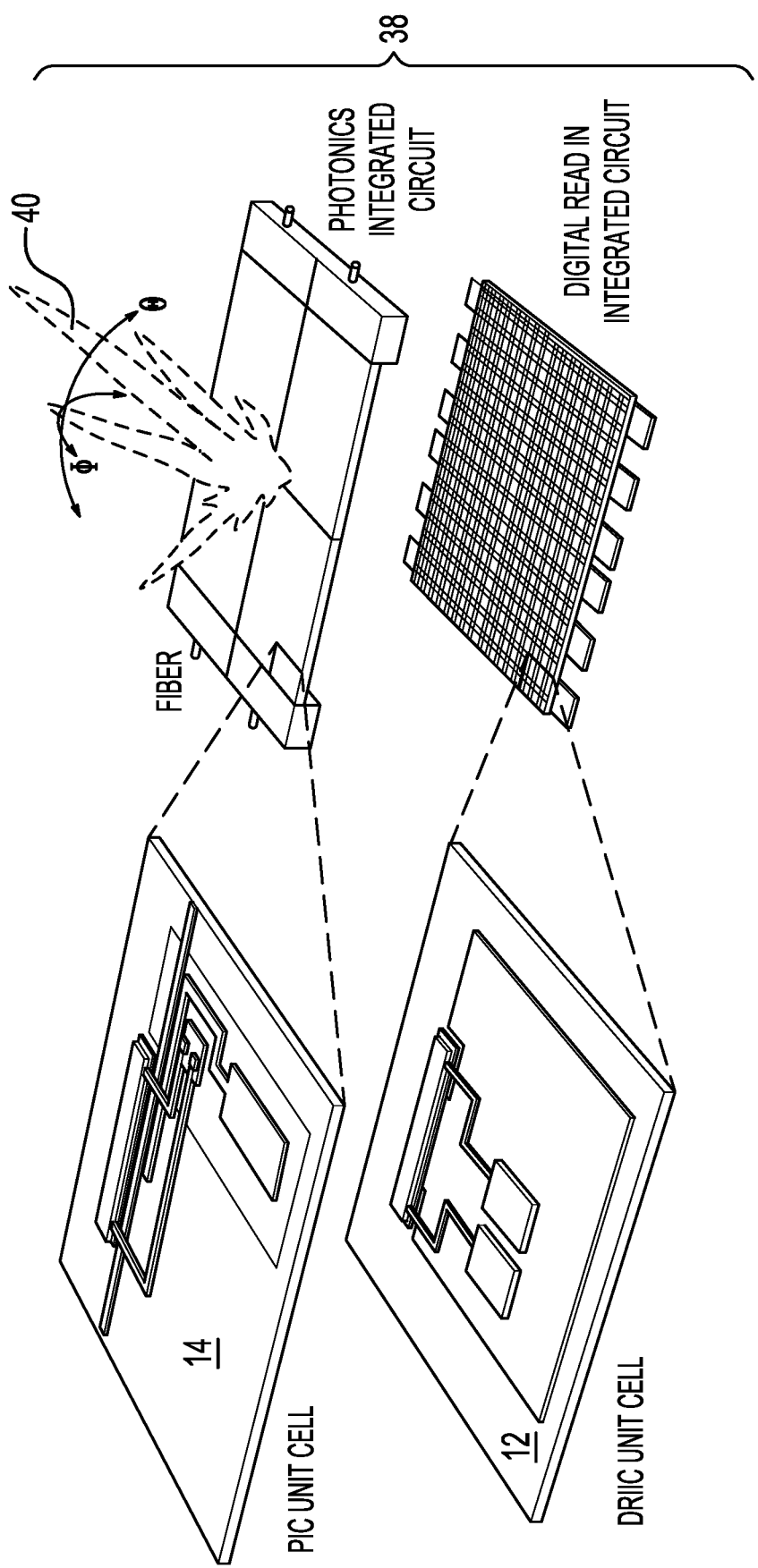
FIG. 6 is an exemplary array of unit cell devices forming a large-scale two-dimensional (2D) photonic array in accordance with the present disclosure.

It will be appreciated that the unit cell device 10 may be scalable and may be used in various applications. For example, an array of unit cell devices 10 may form a large-scale two-dimensional (2D) photonic phased array. FIG. 6 shows an exploded view of an exemplary implementation 600 where an array of unit cells 10 (formed by the EIC 12 and the PIC 14) form a large-scale 2D photonic phased array 38 (e.g., a hybridized die including the array of unit cell devices 10). In this implementation 600, the phase shifting elements 26 may be heating elements and the electronic driver circuits 22 may be heater drivers; however, it is understood that the unit cell device architecture of the present disclosure may include alternate methods of shifting phase, such as using PN junction phase shifting techniques or any other suitable phase shifting technique. In this implementation 600, the phase shift driver 18 may set individual heater driver levels based on computed array phase shifts. Heater drivers of the unit cell devices 10 may apply phase control to respective phase shifting elements 26 (i.e., phase control is applied on an individual element basis). The transmit/receive beams output by adjacent optical antennas may interfere constructively with one another. The collective transmit/receive beams may form a beam 40 that can be dynamically shaped and hemispherically steered (i.e., the large-scale 2D photonic phased array may steer the beam in both azimuth θ and elevation φ directions).

Figure 7:
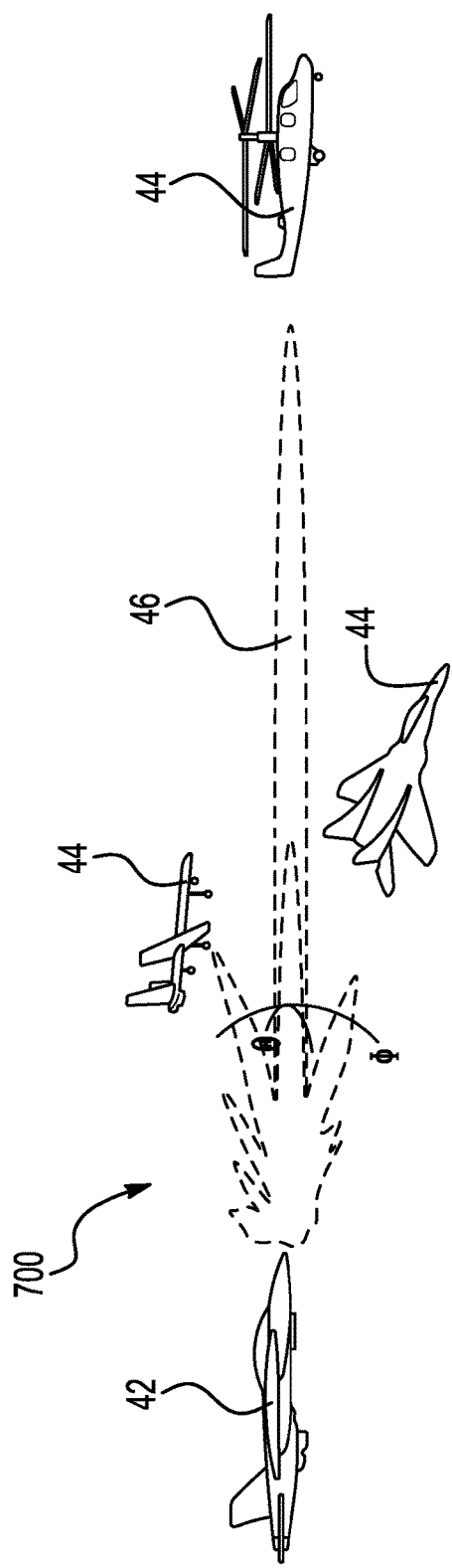
FIG. 7 is a diagram illustrating an exemplary application of the array of unit cell devices formed as a scanning array.

FIG. 7 shows an exemplary implementation 700 where an array of unit cell devices form a scanning array provided on an aerial vehicle 42. In this implementation, the aerial vehicle 42 may use the scanning array to detect objects 44 (e.g., other aerial vehicles). To accomplish this, the aerial vehicle 42 may cause the scanning array to emit and receive a beam 46. The aerial vehicle 42 may individually control the phase of each unit cell device 10 such that the beam 46 may continuously scan hemispherically over a wide area.

Figure 8:
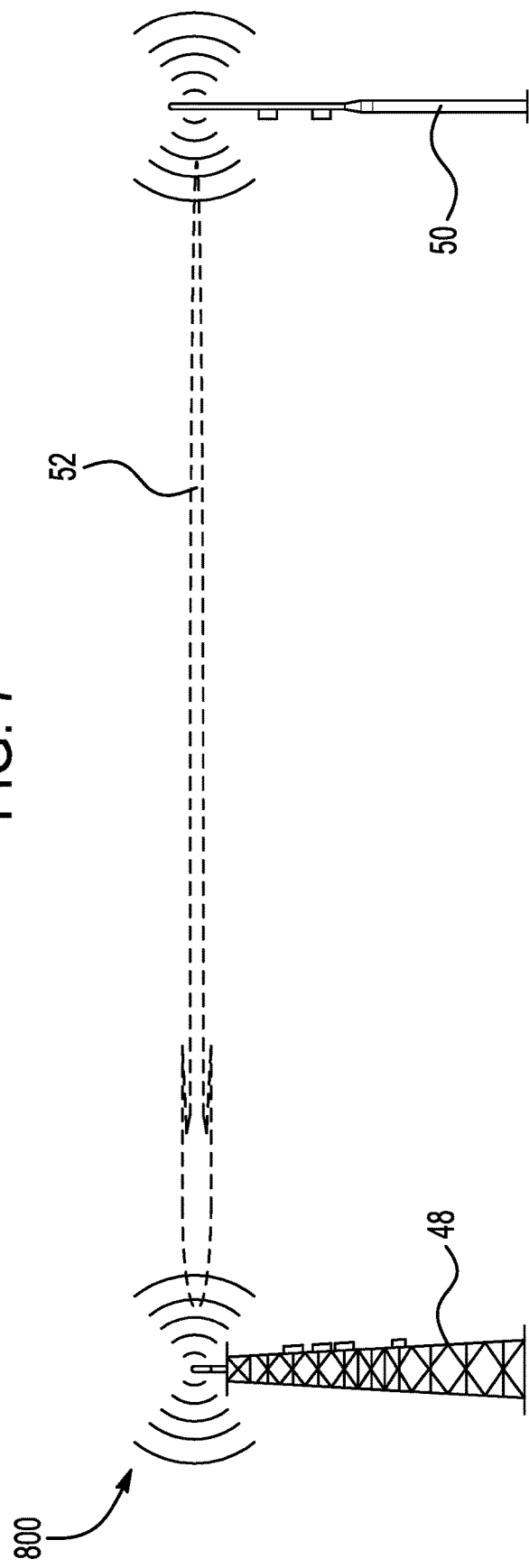
FIG. 8 is a diagram illustrating an exemplary application of the array of unit cell devices formed as tight-beam communication array.

FIG. 8 shows an exemplary implementation 800 where an arrays of unit cell devices are provided on a first tight-beam communication device 48 and a second tight-beam communication device 50. The first tight-beam communication device 48 and the second tight-beam communication device 50 may transmit and/or receive, via the arrays of unit cell devices, a focused beam 52 that creates a high-speed communications link. Additional tight-beam communication arrays may be utilized to form a multiple input, multiple output (MIMO) transceiver configuration.

Figure 9:
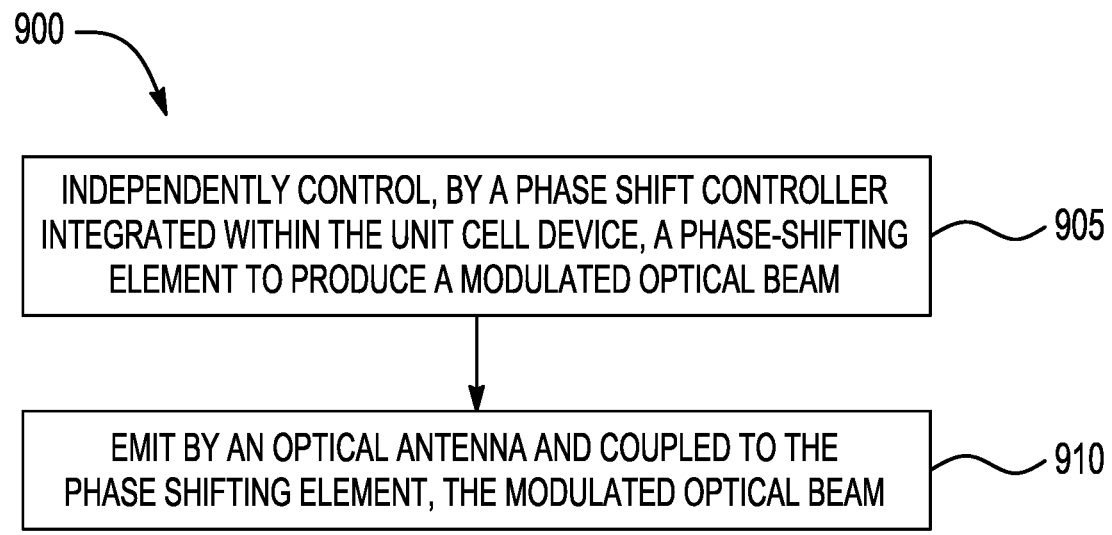
FIG. 9 is a flow diagram of an exemplary method of independently controlling optical beam phase within a unit cell device.

FIG. 9 is a flow diagram of an exemplary method 900 of independently controlling optical beam phase within a unit cell device. At 905, the method 900 may include independently controlling, by a phase shift driver integrated within the unit cell device, a phase-shifting element to produce a modified optical beam. At 910, The method 900 may include emitting or receiving, by an optical antenna electromagnetically coupled to the phase-shifting element, the modified optical beam.

Accordingly, the unit cell device 10 of the present disclosure provides vertical integration of an optical antenna and individual-element phase control within a single unit cell device architecture. The EIC 12 may be a custom DRIIC configured to provide phase control functions. The PIC 14 may be a custom PIC having reflectors for directional output. Unit cell device beam steering may be leveraged as part of coarse and fine phase control architecture. The unit cell device 10 may include a fine-pitch interconnection using a DBH interface that may be extended to other functionalities related to the PIC 14 and/or the EIC 12. The unit cell device 10 may include DBH metal designed to add a reflector function that provides enhanced directional reflecting for the PIC 14. The PIC 14 may undergo a complete substrate removal for unobstructed beam output that increases transmit and receive power. The EIC 12 and the PIC 14 may undergo subsequent processing/etching (i.e., the EIC and the PIC may be etched for optical fiber trench coupling) to simplify integration processes and fiber bonding may maximize power transferred between a fiber and a waveguide. While the present disclosure has been described as providing techniques related to creating large two-dimensional (2D) phased array architectures, it is to be understood that the techniques of the present disclosure may be used to create any suitable phased array, such as a one-dimensional phased array.

Although a certain preferred embodiment or embodiments has been shown and described in the present disclosure, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the present disclosure. In addition, while particular features may have been described above with respect to only one or more of several illustrated embodiments, such feature may be combined with one or more other features of the other embodiments, as may be desired and advantageous for any given or particular application.

What is claimed is:

1. A unit cell device including one or more attached layers, comprising:
a phase-shifting element;
a phase shift driver;
an optical antenna; and
a PIC electrical routing element;
wherein the phase shift driver and the phase-shifting element are integrated within the unit cell device;
wherein the phase shift driver is in electrical communication with the phase-shifting element;
wherein the phase shift driver is configured to independently control the phase-shifting element to produce a modified optical beam;
wherein the optical antenna is separated from the PIC electrical routing element; and
wherein the optical antenna is in a location which is offset perpendicular from the PIC electrical routing element.

2. The unit cell device of claim 1, further comprising a photonic integrated circuit (PIC);
wherein the phase shift driver is attached to at least a portion of the PIC.

3. The unit cell device of claim 2, wherein the phase shift driver is an electronic integrated circuit (EIC).

4. The unit cell device of claim 3, wherein the EIC is a digital read-in integrated circuit.

5. The unit cell device of claim 3 wherein at least a portion of the EIC is directly bonded to the PIC to enable mechanical and electrical integration.

6. The unit cell device of claim 3, further comprising the optical antenna electromagnetically coupled to the phase-shifting element;
wherein the modified optical beam is a transmit beam or a receive beam.

7. The unit cell device of claim 6, further comprising:
the PIC electrical routing element in electrical communication with the phase-shifting element;
an electronic driver circuit;
an EIC electrical routing element in electrical communication with the electronic driver circuit; and
a direct bond hybridization (DBH) connection point;
wherein the PIC electrical routing element is attached to the EIC routing element at the DBH connection point.

8. An array of unit cell devices, each of the unit cell devices comprising:
a phase-shifting element;
a phase shift driver integrated within the unit cell device;
an optical antenna; and
a PIC electrical routing element;
wherein the phase shift driver is in electrical communication with the phase-shifting element;
wherein the phase shift driver is configured to independently control the phase-shifting element to produce a modified optical beam; and
wherein the array of unit cell devices form an electro-optical phased array;
wherein the optical antenna is separated from the PIC electrical routing element; and
wherein the optical antenna is in a location which is offset perpendicular from the PIC electrical routing element.

9. The array of unit cells of claim 8, wherein each unit cell device includes a photonic integrated circuit (PIC); and
wherein the phase shift driver is attached to at least a portion of the PIC.

10. The array of unit devices of claim 9, wherein the phase shift driver is an electronic integrated circuit (EIC).

11. The array of unit cell devices of claim 10, wherein the EIC is a digital read-in integrated circuit.

12. The array of unit cell devices of claim 11, wherein each unit cell device includes the optical antenna; and
wherein each of the modified optical beams of adjacent unit cell devices interfere with one another to form a transmit beam or a receive beam that is shapeable and hemispherically steerable.

13. A method of independently controlling optical beam phase within a unit cell device, the method comprising:

independently controlling, by a phase shift driver integrated within the unit cell device, a phase-shifting element to produce a modified optical beam;

wherein an optical antenna is separated from a PIC electrical routing element; and wherein the optical antenna is in a location which is offset perpendicular from the PIC electrical routing element.

14. The method of claim 13, further comprising connecting the phase shift driver to at least a portion of a photonic integrated circuit (PIC).

15. The method of claim 14, further comprising implementing an electronic integrated circuit (EIC) as the phase shift driver.

16. The method of claim 15, further comprising implementing a digital read-in integrated circuit as the phase shift driver.

17. The method of claim 15, further comprising directly bonding the PIC to the EIC.

18. The method of claim 15, further comprising emitting or receiving, by the optical antenna electromagnetically coupled to the phase-shifting element, the modified optical beam.

19. The method of claim 18, further comprising removing a substrate of the PIC such that emitting or receiving the modified optical beam is unobstructed.

20. The method of claim 18, further comprising etching the EIC to form an optical fiber trench coupling.

* * * * *